(12) United States Patent
Akiba et al.

(10) Patent No.: US 6,466,715 B1
(45) Date of Patent: Oct. 15, 2002

(54) MULTIPLEXER/DEMULTIPLEXER FOR WDM OPTICAL SIGNALS

(75) Inventors: Kenji Akiba, Fukushima; Kenichi Morosawa, Ibaraki, both of (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 09/464,956

(22) Filed: Dec. 16, 1999

(30) Foreign Application Priority Data

Jun. 25, 1999 (JP) .............................. 11-180118

(51) Int. Cl.[7] .................................................. G02B 6/34
(52) U.S. Cl. ............................. 385/37; 385/46; 385/39; 385/50; 385/17
(58) Field of Search .............................. 385/37, 24, 39, 385/46, 50, 17

(56) References Cited

U.S. PATENT DOCUMENTS 5,136,671 A * 8/1992 Dragone ...................... 385/37

* cited by examiner

*Primary Examiner*—Cassandra Spyrou
*Assistant Examiner*—Fayez Assaf
(74) *Attorney, Agent, or Firm*—Scully, Scott, Murphy & Presser

(57) ABSTRACT

At least one input waveguide, plural output waveguides, an arrayed waveguide diffraction grating composed of plural channel waveguides successively extending in a length by $\Delta L$, an input slab waveguide for connecting the input waveguide with the arrayed waveguide diffraction grating, and an output slab waveguide for connecting the arrayed waveguide diffraction grating with the output waveguides are respectively formed on a substrate. An interval between central axes of the adjacent channel waveguides composing the arrayed waveguide diffraction grating slowly varies through the whole channel waveguides on one or both of the input and output ends of the arrayed waveguide diffraction grating.

7 Claims, 10 Drawing Sheets

MULTIPLEXER/DEMULTIPLEXER FOR WDM OPTICAL SIGNALS

FIELD OF THE INVENTION

The present invention relates to a multiplexer/demultiplexer for wavelength division multiplexed (WDM, hereinafter) optical signals, and especially to a multiplexer/demultiplexer for WDM optical signals in which the fluctuation of an insertion loss caused by the fluctuation of a wavelength of an optical signal is slight and the WDM optical signals are multiplexed or demultiplexed with high stability.

BACKGROUND OF THE INVENTION

In the field of the WDM optical communication, it is universally admitted that an arrayed waveguide diffraction grating is promising as a multiplexer/demultiplexer for multiplexing or demultiplexing the WDM optical signals, and various proposals have been made on this subject (Japanese Patent Application Laid-Open Nos.4-116607, 4-1634064, 4-220624, 4-3263084, and 5-157920). Especially, since the arrayed waveguide diffraction grating having a flat passband characteristic hardly shows a variation in an insertion loss caused by the fluctuation of a wavelength of the optical signal and multiplexes or demultiplexes the optical signals with high stability, the engineers in this field place their hopes on this device as one of key technologies in the WDM optical communication (U.S. Pat. No. 5,412,744).

FIG. 1 schematically shows a conventional multiplexer/demultiplexer of an arrayed waveguide diffraction grating type. In this example, nine optical signals having the wavelengths of $\lambda_1$ to $\lambda_9$ ($\lambda_1 < \lambda_2 < \ldots < \lambda_8 < \lambda_9$) are multiplexed or demultiplexed by the device shown in FIG. 1. For simplicity of explanation, an optical signal having a wavelength $\lambda_i$ (i=1, 2, ... 8, 9) will be expressed by the optical signal $\lambda_i$.

As shown in FIG. 1, the conventional multiplexer/demultiplexer for the WDM optical signals are composed of a substrate 201, an input waveguide 202, an input slab waveguide 204, an arrayed waveguide diffraction grating 206 comprising plural channel waveguides 205 having different lengths, an output slab waveguide 207, and nine output waveguides 208. The length of the channel waveguide 205 monotonously increases as the position thereof in the arrayed waveguide diffraction grating 206 is high, and the difference in the length between the adjacent channel waveguides 205 is ΔL, which will be explained afterward.

FIGS. 2A to 2C schematically shows electric field distributions of the optical signal at important portions in the conventional multiplexer/demultiplexer of the arrayed waveguide diffraction grating type. FIG. 2A shows the electric field distribution 209 of the optical signal at a mode conversion portion 203 in the E–E' direction, FIG. 2B shows the electric field distribution 211 of the optical signal at the input end 210 of the arrayed waveguide diffraction grating 206 in the F–F' direction, and FIG. 2C shows the electric filed distribution 213 at the output end 212 of the arrayed waveguide diffraction grating 206 in the G–G' direction.

FIGS. 3A to 3C schematically show phase distributions of the optical signals at the important portions of the conventional multiplexer/demultiplexer of the arrayed waveguide diffraction grating. FIGS. 3A to 3C show phase distributions of the optical signals at the output end 212 of the arrayed waveguide diffraction grating 206 in the G–G' direction. FIG. 3A, FIG. 3B and FIG. 3C respectively show the phase distributions 214, 215 and 216 of the optical signals $\lambda_1$, $\lambda_5$ and $\lambda_9$.

FIGS. 4A to 4B schematically show differences in the phase distribution between the optical signals at the output end 212 of the arrayed waveguide diffraction grating 206 in the G–G' direction. FIG. 4A show a difference between phase distributions 214 and 215, those respectively corresponding to the optical signals $\lambda_1$ and $\lambda_5$. FIG. 4B shows the difference between phase distribution 216 and 215, those respectively corresponding to the optical signals $\lambda_9$ and $\lambda_5$.

FIG. 5 respectively show the electric field distributions 220, 221 and 222 of the optical signals $\lambda_1$, $\lambda_5$ and $\lambda_9$ on a focusing surface 219 of the conventional multiplexer/demultiplexer of the arrayed waveguide diffraction grating type in the H–H' direction.

Thereafter, the function of the conventional multiplexer/demultiplexer of the arrayed waveguide diffraction grating type will be explained mainly referring to FIG. 1. The difference in the length ΔL between the adjacent channel waveguides 205 which constitute the arrayed waveguide diffraction grating 206 is given by the following relation.

$$\Delta L = 2m\pi/\beta(\lambda_5) \tag{1}$$

In the equation (1), m is a diffraction order number (a positive integer) and $\beta(\lambda_5)$ is a propagation constant of the channel waveguide 205 for the optical signal $\lambda_5$.

The optical signals $\lambda_1$ to $\lambda_9$ supplied to the input waveguide 202 successively propagate through the mode conversion portion 203, the input slab waveguide 204, the arrayed waveguide diffraction grating 206, the output slab waveguide 207 and the output waveguides 208.

As shown in FIG. 2A, the electric field distribution 209 of each optical signal at the mode conversion portion 203 shows a symmetric twin-peak-shaped profile in the E–E' direction.

As shown in FIG. 2B, the electric field distribution 211 of the optical signal at the input end 210 of the arrayed waveguide diffraction grating 206 shows a maximum value and minimum values in the F–F' direction because of an effect of diffraction. At the input end 210 of the arrayed waveguide diffraction grating 206, the optical signal is divided, supplied to the respective channel waveguides 205 and propagate therethrough.

As shown in FIG. 2C, the electric field distribution 213 of each of the optical signals $\lambda_1$ to $\lambda_9$ at the output end 212 of the arrayed waveguide diffraction grating 206 in the G–G' direction is a reproduction of the electric field distribution 211 at the input end 210 of the arrayed waveguide diffraction grating 206 in the F–F' direction.

As shown in FIGS. 3A to 3C, the phase distributions of the optical signals $\lambda_1$, $\lambda_5$ and $\lambda_9$ at the output end 212 of the arrayed waveguide diffraction grating 206 in the G–G' direction are different dependently on the wavelengths of the optical signals. Since the optical signal $\lambda_5$ satisfies the equation (1), the phase istribution 215 is symmetric. The phase distributions of the ther optical signals at the output end 212 of the arrayed waveguide diffraction grating 206 incline to the G–G' direction in accordance with their propagation constants.

As shown in FIGS. 4A to 4B, the difference in the phase destruction between the optical signals $\lambda_1$ and $\lambda_5$ and the same between the optical signals $\lambda_9$ and $\lambda_5$ continuously vary at the output end 212 of the arrayed waveguide diffraction grating 206 in the G–G' direction. In the output slab waveguide 207, the respective optical signals propagate in the directions corresponding to these inclinations. Accordingly, the optical signals are respectively focussed at different points $Y_1$ to $Y_9$ (not shown) on a focussing surface 219 of the output slab waveguide 207.

As shown in FIG. 5, the electric filed distributions 220, 221 and 222 on the focusing surface 219 in the H–H' direction are affected by aberration of the output slab waveguide 207. The electric field distribution 221 of the optical signal $\lambda_5$ reproduces the electric field distribution 209 in the mode conversion portion 203 and shows a symmetric twin-peak-shaped profile. On the other hand, the electric field distributions 220 and 222 of the optical signals $\lambda_1$ and $\lambda_9$ show asymmetric profiles. Since the main cause of asymmetry is aberration, asymmetry becomes noticeable as the optical signal is focussed near the edges of the focussing surface 219 close-by the arc HH'. The respective optical signals starting from the focussing surface 219 close-by the arc HH' launch the output waveguides 208, propagate therethrough, and are separately taken out from the terminal end 223.

FIG. 6 schematically shows the relations between the insertion losses 224, 225, 226 and 227 and the wavelength of the conventional multiplexer/demultiplexer of the arrayed waveguide diffraction grating type.

As shown in FIGS. 5 to 6, the insertion losses of the output waveguides 208 are determined by multiplexed integrals of the electric field distributions 220, 221 and 222 of the optical signals on the focusing surface 219 and inherent mode functions of the output waveguides 208. The electric field distribution of the optical signal is displaced on the focusing surface 219 in the H–H' direction in accordance with the wavelengths thereof. The profile of the electric field distribution becomes asymmetric as the optical signal is focused at a point which is remote from $Y_5$. When the optical signal is focused around $Y_5$, the profile of the electric field distribution is nearly symmetric, and thereby the insertion loss does not fluctuate so much by a slight fluctuation of the wavelength of the optical signal. On the other hand, when the optical signal is focused near $Y_1$ or $Y_9$, the profile of the electric field distribution 220 or 222 is asymmetric, and thereby the insertion loss noticeably fluctuates by the slight fluctuation of the wavelength of the optical signal. As seen from the relations between the insertion losses of the output waveguides 208 and the wavelength shown in FIG. 6, although the passband characteristic 227 of the optical signal $\lambda_5$ is flat, those of the optical signals $\lambda_1$ and $\lambda_9$, both respectively corresponding to the insertion loss against the wavelength characteristics 225 and 226, are inclined.

As mentioned in the above, according to the conventional multiplexer/demultiplexer of the arrayed waveguide diffraction grating type, since the passband characteristic of the insertion loss is not flat because of aberration of the output slab waveguide, the insertion loss significantly fluctuates by the fluctuation of the wavelength of the optical signal, and the characteristic thereof is not sufficiently satisfactory.

SUMMARY OF THE INVENTION

Accordingly, it is an object of the invention to provide a multiplexer/demultiplexer in which an insertion loss of an optical signal does not significantly fluctuate by a fluctuation of a wavelength of an optical signal and optical signals are multiplexed or demultiplexed with high stability.

According to the feature of the invention, an multiplexer/demultiplexer comprises:

at least one input waveguide formed on a substrate, plural output waveguides formed on the substrate, an arrayed waveguide diffraction grating composed of plural channel waveguides successively extending in a length by $\Delta L$, an input slab waveguide for coupling the at least one input waveguide with an input end of the arrayed waveguide diffraction grating, and an output slab waveguide for coupling an output end of the arrayed waveguide diffraction grating with the output waveguides, wherein an interval between central axes of the adjacent channel waveguides composing the arrayed waveguide diffraction grating slowly varies through the whole channel waveguides at one or both of the input and output ends of the arrayed waveguide diffraction grating.

In the multiplexer/demultiplexer for the WDM optical signals, it is desirable that the central axes of the channel waveguides forming the arrayed waveguide diffraction grating are radially disposed with respect to the first and second predetermined reference points at both the input and output ends of the arrayed waveguide diffraction grating, and angles formed by the central axes of the adjacent channel waveguides slowly vary through the whole channel waveguides.

BRIEF DESCRIPTION OF THE DRAWINGS

The present invention will be explained in more detail in conjunction with appended drawings, wherein.

DESCRIPTION OF THE PREFERRED EMBODIMENTS

Figure 1:
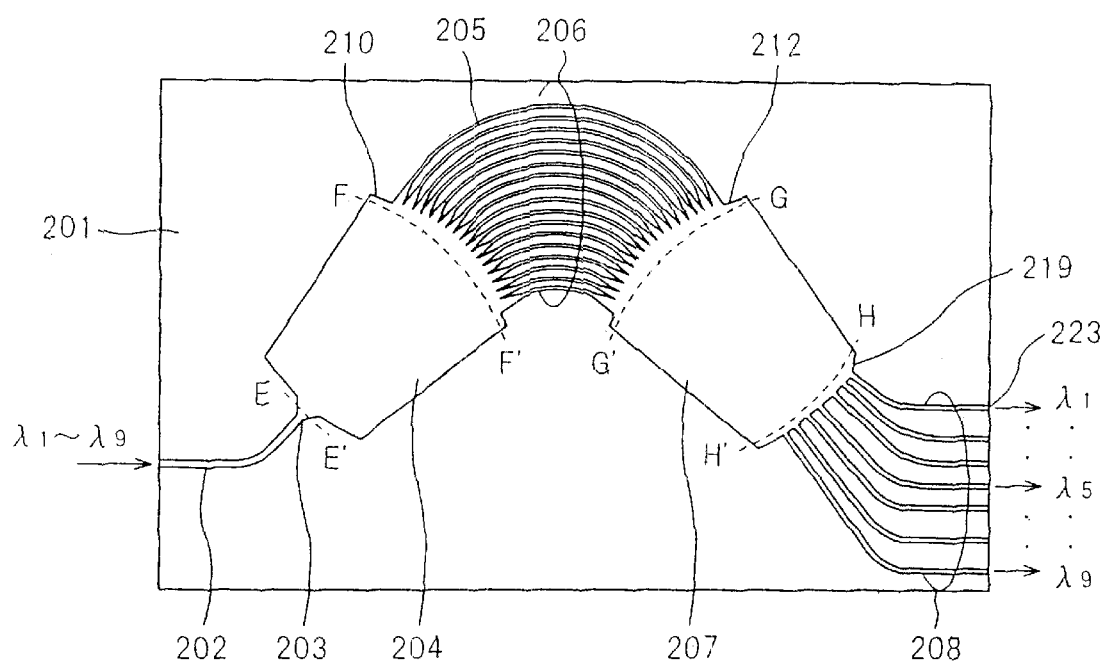
FIG. 1 schematically shows a conventional multiplexer/demultiplexer of an arrayed waveguide diffraction grating type.
Figure 2A:
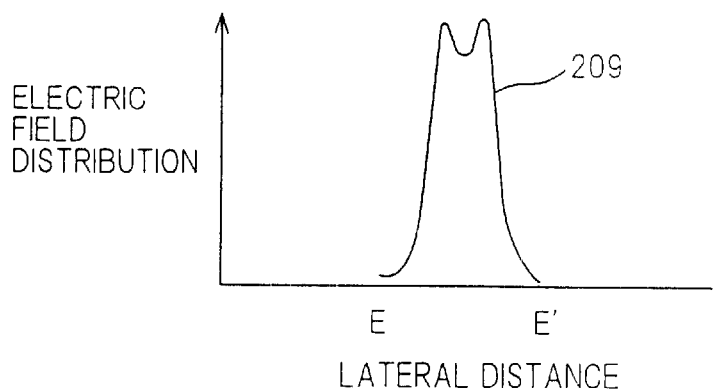
FIG. 2A shows an electric field distribution 209 of an optical signal at a mode conversion portion 203 in the E–E' direction in a conventional multiplexer/demultiplexer.
Figure 2B:
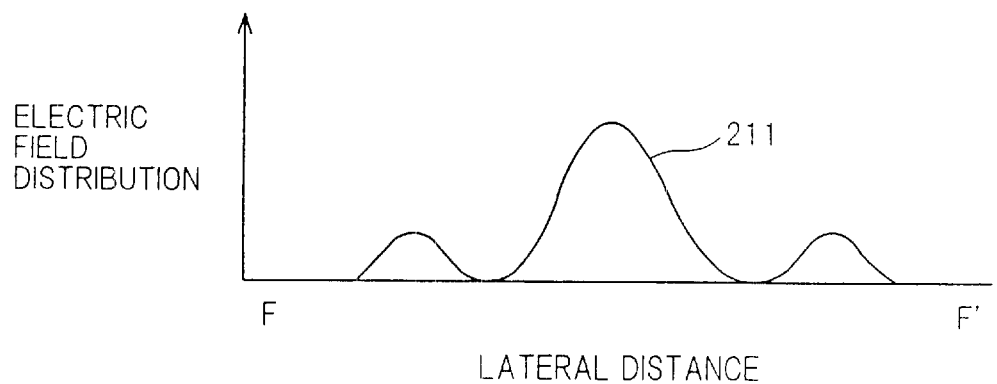
FIG. 2B shows an electric field distribution 211 of an optical signal at an input end 210 of an arrayed waveguide diffraction grating 206 in the F–F' direction in a conventional multiplexer/demultiplexer.
Figure 2C:
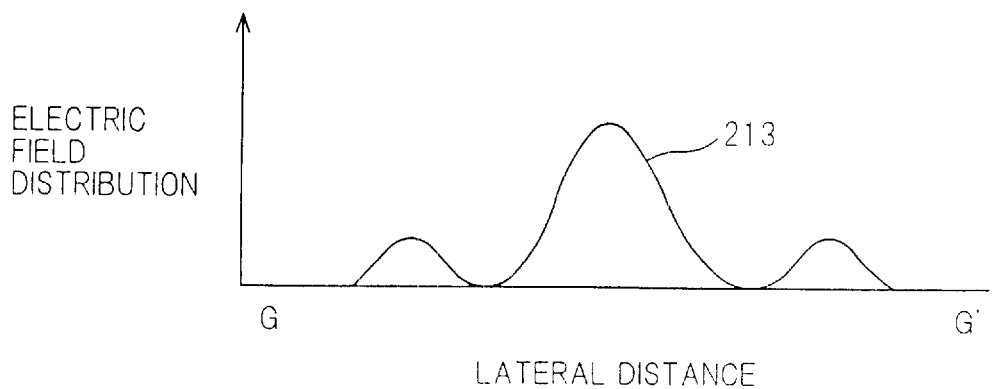
FIG. 2C shows an electric field distribution 213 of an optical signal at an output end 212 of an arrayed waveguide diffraction grating 206 in the G–G' direction in a conventional multiplexer/demultiplexer.
Figure 3A:
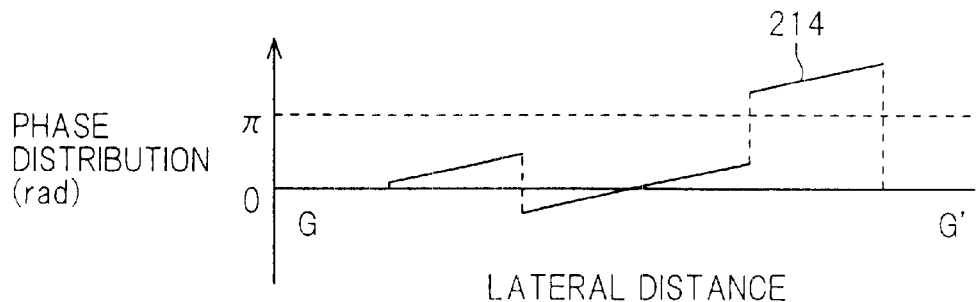
FIG. 3A shows a phase distribution 214 of an optical signal $\lambda_1$ at an output end 212 of an arrayed waveguide diffraction grating 206 in the G–G' direction in a conventional multiplexer/demultiplexer.
Figure 3B:
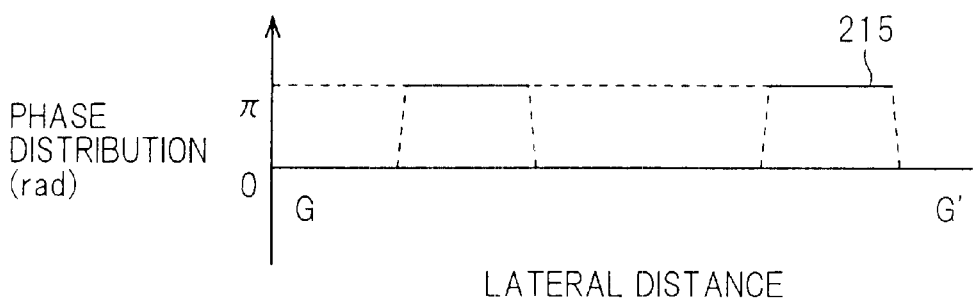
FIG. 3B shows a phase distribution 215 of an optical signal $\lambda_5$ at an output end 212 of an arrayed waveguide diffraction grating 206 in the G–G' direction in a conventional multiplexer/demultiplexer.
Figure 3C:
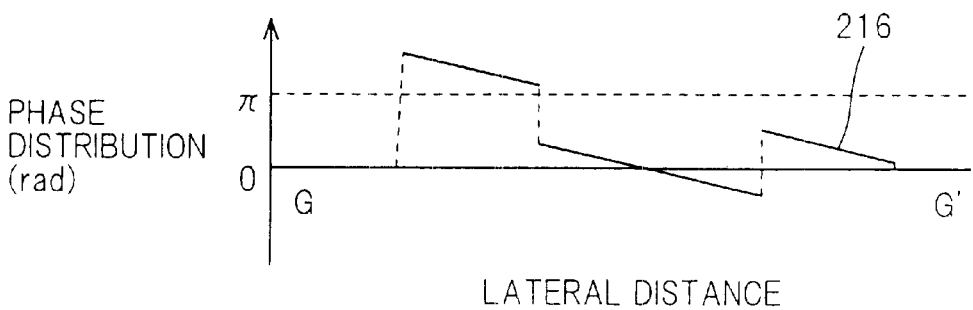
FIG. 3C shows a phase distribution 216 of an optical signal $\lambda_9$ at an output end 212 of an arrayed waveguide diffraction grating 206 in the G–G' direction in a conventional multiplexer/demultiplexer.
Figure 4A:
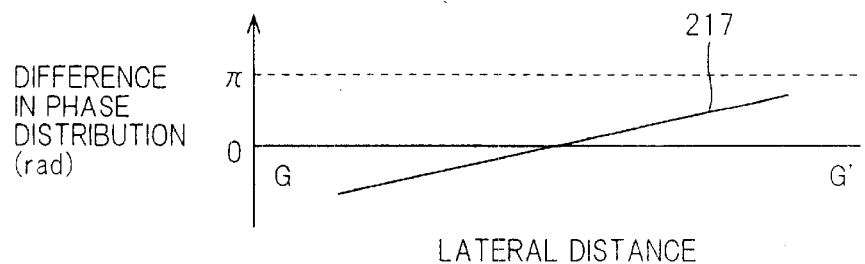
FIG. 4A shows a difference in a phase distribution at an output end 212 of an arrayed waveguide diffraction grating 206 between optical signals $\lambda_1$ and $\lambda_5$ in a conventional multiplexer/demultiplexer.
Figure 4B:
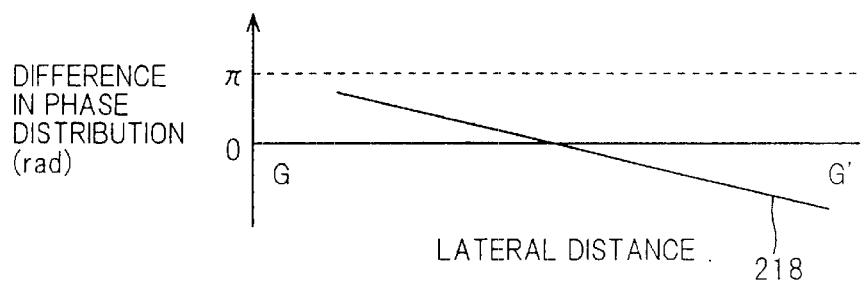
FIG. 4B shows a difference in a phase distribution at an output end 212 of an arrayed waveguide diffraction grating 206 between optical signals $\lambda_9$ and $\lambda_5$ in a conventional multiplexer/demultiplexer.
Figure 5:
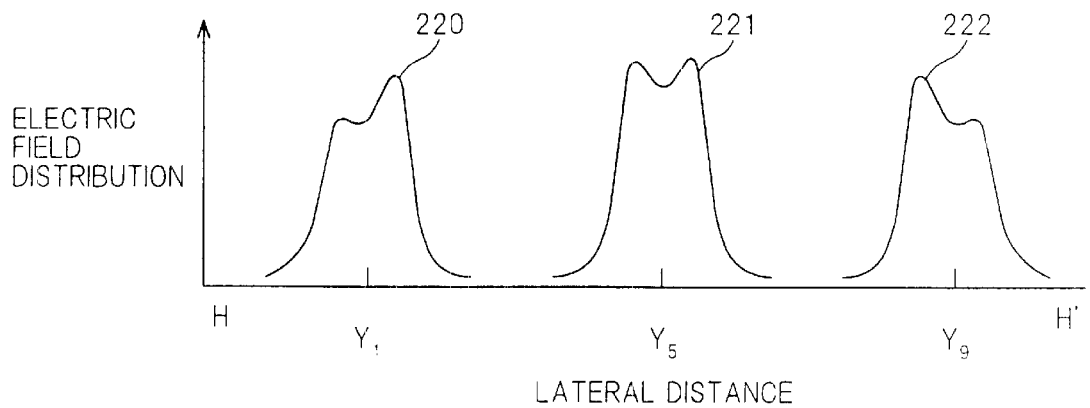
FIG. 5 schematically shows electric field distributions 220, 221 and 222 of optical signals $\lambda_1$, $\lambda_5$ and $\lambda_9$ at a focusing surface 219 of a conventional multiplexer/demultiplexer of an arrayed waveguide diffraction grating type in the H–H' direction, FIG. 6 schematically shows relations between insertion losses and a wavelength 224, 225, 226 and 227 of a conventional multiplexer/demultiplexer of an arrayed waveguide diffraction grating type.
Figure 6:
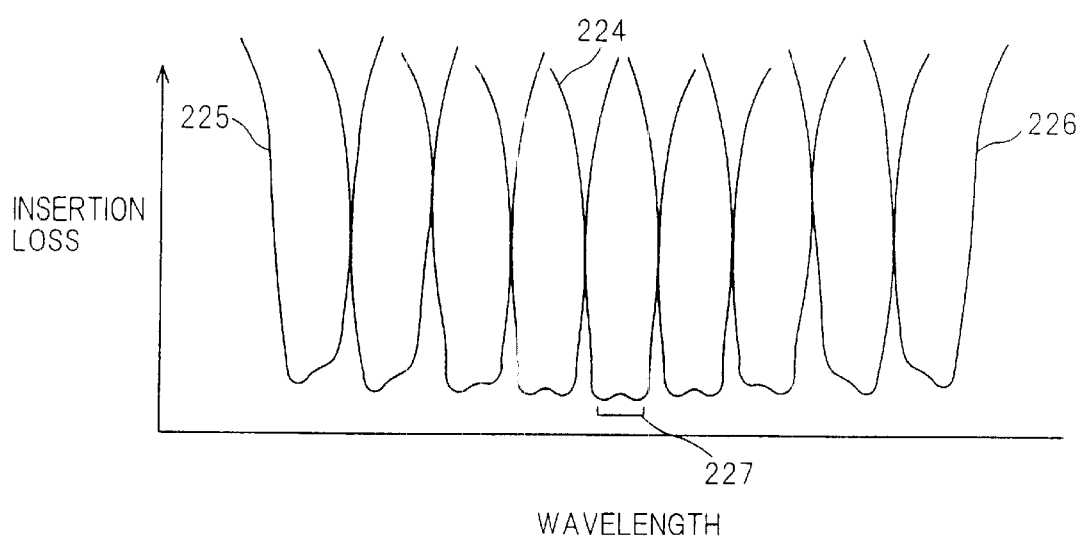
Figure 7A:
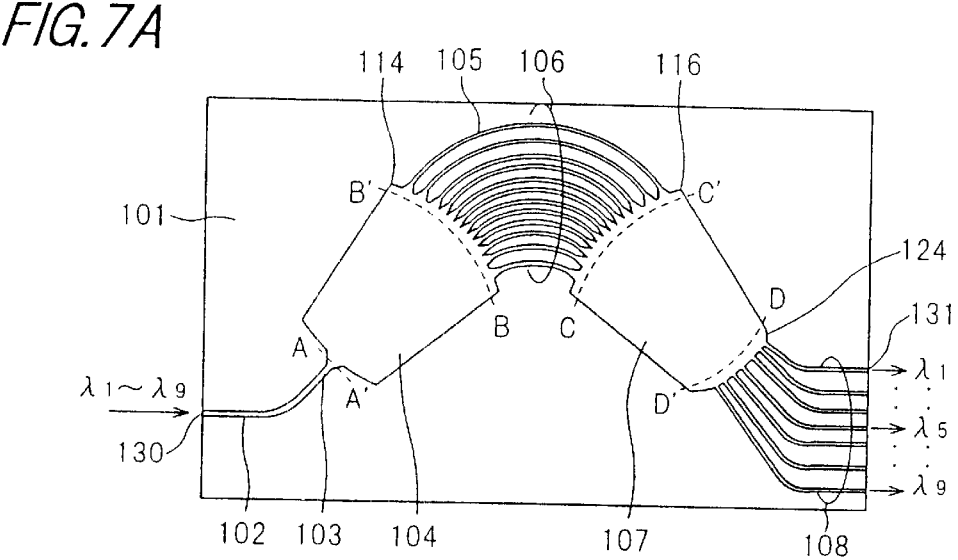
FIG. 7A shows a general view of a multiplexer/demultiplexer of an array waveguide diffraction grating type according to a preferred embodiment of the invention.
Figure 7B:
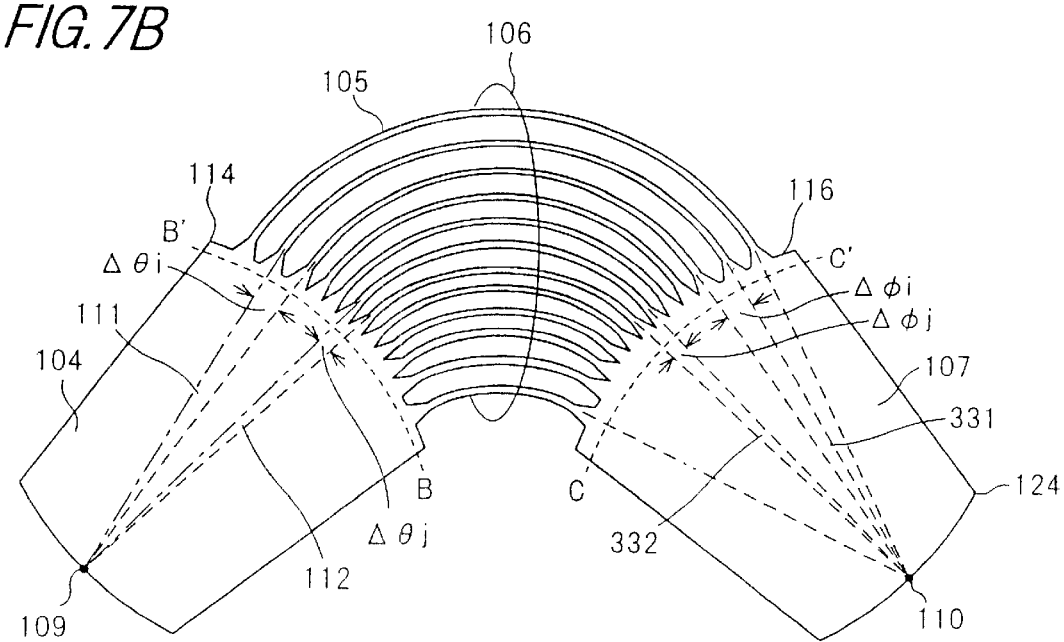
FIG. 7B shows an enlarged diagram of an arrayed waveguide diffraction grating shown in FIG. 7A.

Thereafter, the embodiments of the invention will be explained referring to the appended drawings. FIGS. 7A to 7B schematically show a multiplexer/demultiplexer of an arrayed waveguide diffraction grating type according to a preferred embodiment. FIG. 7A shows a general view thereof, and FIG. 7B shows an enlarged diagram of the arrayed waveguide diffraction grating. In the aforementioned drawings, the multiplexer/demultiplexer for multiplexing or demultiplexing nine optical signals $\lambda_1$ to $\lambda_9 (\lambda_1 < \lambda_2 - - - < \lambda_8 < \lambda_9)$ is shown as an example.

As shown in FIG. 7A, an input waveguide 102, an input slab waveguide 104, an arrayed waveguide diffraction grating 106 composed of N channel waveguide 105 having different lengths, an output slab waveguide 107 and output waveguides 108 are formed on a substrate 101. In the arrayed waveguide diffraction grating 106, the difference in the length between the adjacent channel waveguides 105 is given by $\Delta L$, which has been shown in equation (1). Moreover, a mode conversion portion 103 for flattening an insertion loss against the wavelength characteristic in a passband is provided between the input waveguide 102 and the input slab waveguide 104.

As shown in FIG. 7B, at an input end 114 of the arrayed waveguide diffraction grating 106, the respective channel waveguides 105 composing the arrayed waveguide diffraction grating 106 are disposed radially with respect to a reference point 109 which is situated at the middle point 109 of an input end of the input slab waveguide 104. Similarly, at an output end 116 of the arrayed waveguide diffraction grating 106, the respective channel waveguides 105 are disposed radially with respect to a reference point 110 which is situated at the middle point 110 of an output end 124 of the output slab waveguide 107. An angle formed by the adjacent channel waveguides 105 slowly varies as the observation point moves from the lower position (on the side of BC) to the higher position (on the side of B'C').

When the total number of the channel waveguides is N, a number assigned to one of the channel waveguides is i, a number assigned to a reference channel waveguide is j, and an angle formed by the i th channel waveguide and the i+1 th channel waveguides is denoted by $\Delta\theta i$ and $\Delta\phi i$ at the input and output ends (114 and 116) of the arrayed waveguide diffraction grating 106 respectively as shown in FIG. 7B. $\Delta\theta i$ and $\Delta\phi i$ are respectively functions of i–j which slowly vary against i–j.

In this embodiment, $\Delta\theta i/\Delta\theta j$ and $\Delta\phi i/\Delta\phi j$ are respectively given as polynominals of $|i-j|$, each containing 1 as a constant term. In other words, $\Delta\theta i$ and $\Delta\phi i$ are expressed by $$\Delta\theta i = \Delta\theta j\{1 + \Sigma_k A_k |i-j|^k\}, \qquad (2A)$$

and $$\Delta\phi i = \Delta\phi j\{1 + \Sigma_k B_k |i-j|^k\}, \qquad (2B)$$

wherein k is a positive integer, and $$|A_k|, |B_k| \ll 1.$$

$B_k$ is either dependent on or independent of $A_k$.

When only the first order terms in the summations of the right sides of the above equations are extracted, $\Delta\theta i$ and $\Delta\phi i$ are given as $$\Delta\theta i = \Delta\theta j\{1 + A_1 |i-j|\}, \qquad (3A)$$

and $$\Delta\phi i = \Delta\phi j\{1 + B_1 |i-j|\}, \qquad (3B)$$

When $A_1 = B_1 = A$ and $\Delta\theta j = \Delta\phi j$, $\Delta\theta i$ and $\Delta\phi i$ are given by $$\Delta\theta i = \Delta\phi i = \Delta\theta i, \{1 + A|i-j|\} \qquad (4)$$

It should be noted that $\Delta\theta$, $\Delta\theta j$, $\Delta\phi i$ and $\Delta\phi j$ are respectively denoted by 111, 112, 331 and 332 in FIG. 7B.

Hereafter, the explanation will be given on the basis of the equation (4).

In this embodiment, the total number N of the channel waveguides 105 composing the arrayed waveguide diffraction grating 106 is 60, and the number assigned to the reference channel waveguide j is 30. The angle Δθ30 formed by the 30th channel waveguide and the 31st channel waveguide is 0.2 deg. and the constant A is 0.0002. As seen from equation (4), if A is too small, the effect of compensation is insufficient, and if A is too large, the effect of compensation is over. Accordingly, it is desirable that A is larger than −0.001 and smaller than 0.001.

Figure 8A:
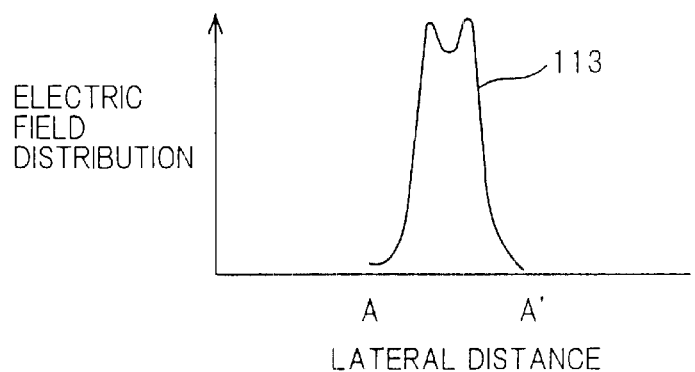
FIG. 8A shows an electric field distribution 113 at a mode conversion portion 103 in the A–A' direction in a multiplexer/demultiplexer according to the invention.
Figure 8B:
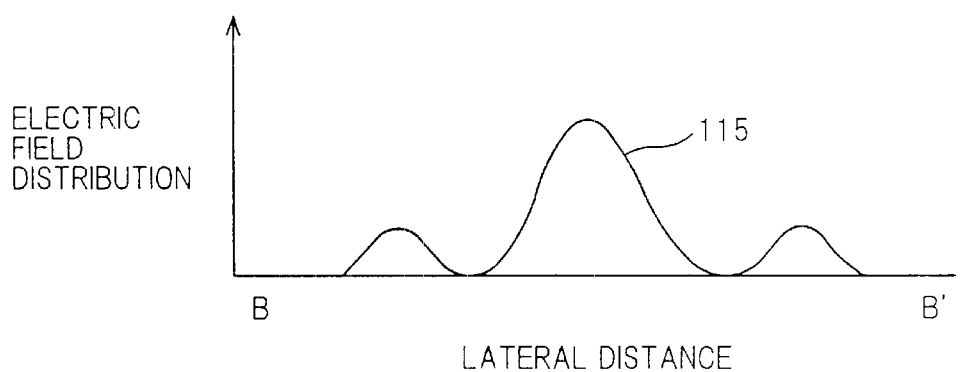
FIG. 8B shows an electric field distribution 115 of an optical signal at an input end 114 of an arrayed waveguide diffraction grating 106 in the B–B' direction in the multiplexer/demultiplexer according to the invention.
Figure 8C:
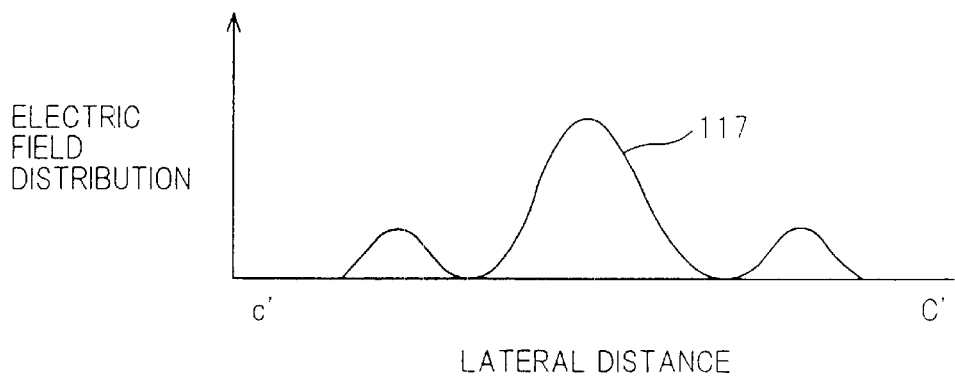
FIG. 8C shows an electric field distribution 117 at an output end 116 of an arrayed waveguide diffraction grating 106 in the C–C' direction in the multiplexer/demultiplexer according to the invention.

FIGS. 8A to 8C schematically show electric field distributions of the optical signal at important portions of the multiplexer/demultiplexer of the arrayed waveguide diffraction grating type according to the preferred embodiment of the invention. FIG. 8A shows the electric field distribution 113 at the mode conversion portion 103 in the A–A' direction. FIG. 8B shows the electric field distribution 115 of the optical signal at the input end 114 of the arrayed waveguide diffraction grating 106 in the B–B' direction, and FIG. 8C shows the electric field distribution 117 of the optical signal at the output end 116 of the arrayed waveguide diffraction grating 106 in the C–C' direction.

Figure 9A:
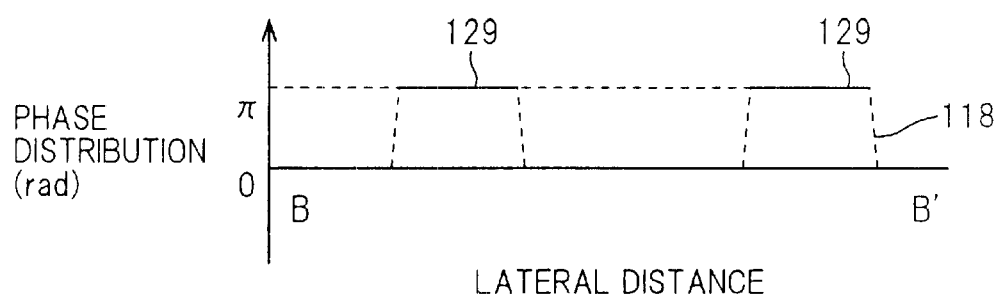
FIG. 9A shows a phase distribution 118 of optical signals $\lambda_1$ to $\lambda_9$ at an input end 114 of an arrayed waveguide diffraction grating 106 in the B–B' direction in the multiplexer/demultiplexer according to the invention.
Figure 9B:
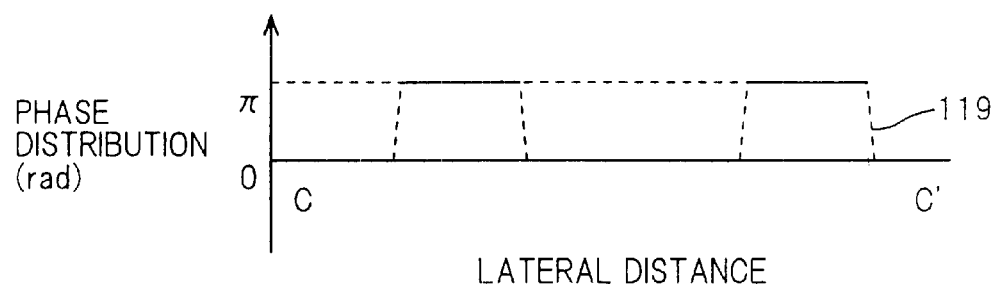
FIG. 9B shows a phase distribution 119 of an optical signal $\lambda_5$ at an output end 116 of an arrayed waveguide diffraction grating 106 in the C–C' direction in the multiplexer/demultiplexer according to the invention.

FIGS. 9A to 9B schematically show phase distributions of the optical signals at the important portions of the multiplexer/demultiplexer of the arrayed waveguide diffraction grating type according to the preferred embodiment of invention. FIG. 9A shows the phase distribution 118 of the optical signals $\lambda_1$ to $\lambda_9$ at at the input end 114 of an arrayed waveguide diffraction grating 106 in the B–B' direction, and FIG. 9B shows the phase distribution 119 of the optical signal $\lambda_5$ at the output end 116 of the arrayed waveguide diffraction grating 106 in the C–C' direction.

Figure 10A:
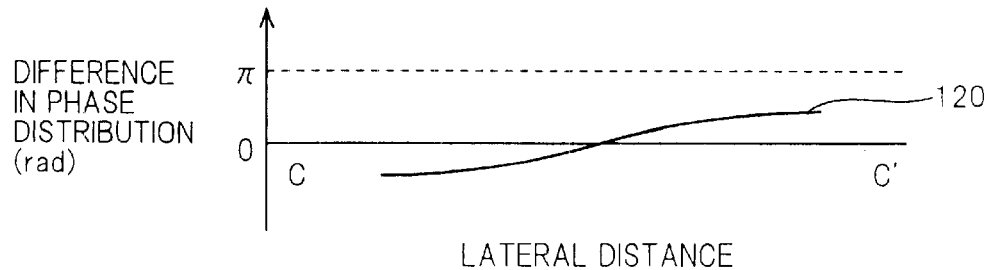
FIG. 10A shows a difference in a phase distribution at an output end 116 of an arrayed waveguide diffraction grating 106 between the optical signals $\lambda_1$ and $\lambda_5$ in the multiplexer/demultiplexer according to the invention.

FIG. 10A shows the difference in the phase distribution at the output end 116 of the arrayed waveguide diffraction grating 106 between the optical signals $\lambda_1$ and $\lambda_5$.

Figure 10B:
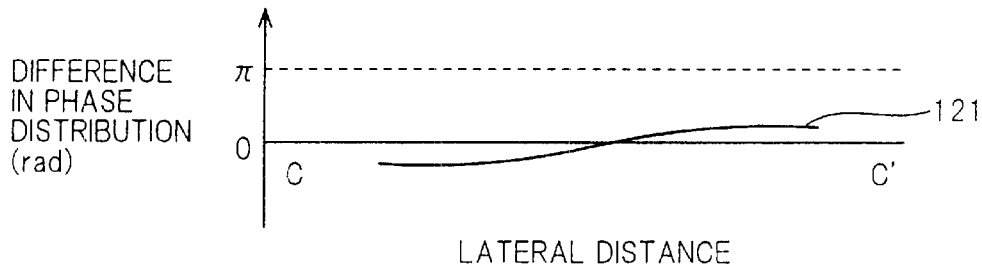
FIG. 10B shows a difference in a phase distribution at an output end 116 of an arrayed waveguide diffraction grating 106 between the optical signals $\lambda_3$ and $\lambda_5$ in the multiplexer/demultiplexer according to the invention.

FIG. 10B shows the difference in the phase distribution at the output end 116 of the arrayed waveguide diffraction grating 106 between the optical signals $\lambda_3$ and $\lambda_5$.

Figure 10C:
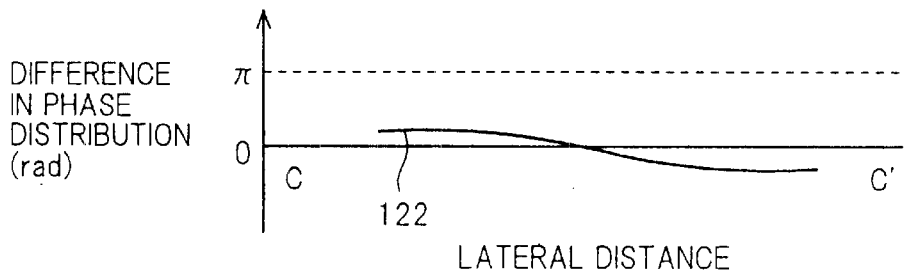
FIG. 10C shows a difference in a phase distribution at an output end 116 of an arrayed waveguide diffraction grating 106 between the optical signals $\lambda_7$ and $\lambda_5$ in the multiplexer/demultiplexer according to the invention.

FIG. 10C shows the difference in the phase distribution at the output end 116 of the arrayed waveguide diffraction grating 106 between the optical signals $\lambda_7$ and $\lambda_5$.

Figure 10D:
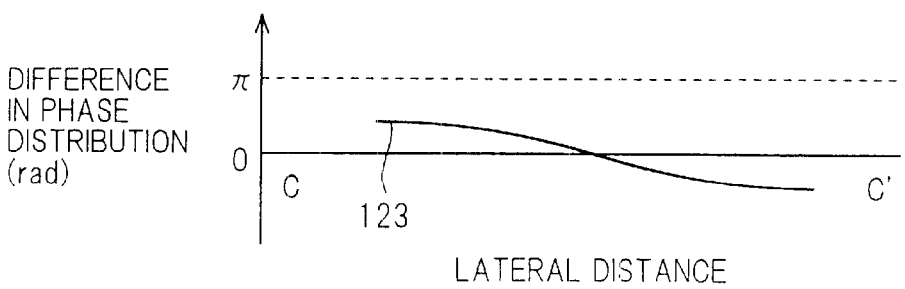
FIG. 10D shows a difference in a phase distribution at an output end 116 of an arrayed waveguide diffraction grating 106 between the optical signals $\lambda_9$ and $\lambda_5$ in the multiplexer/demultiplexer according to the invention.

FIG. 10D shows the difference in the phase distribution at the output end 116 of the arrayed waveguide diffraction grating 106 between the optical signals $\lambda_9$ and $\lambda_5$.

Figure 11:
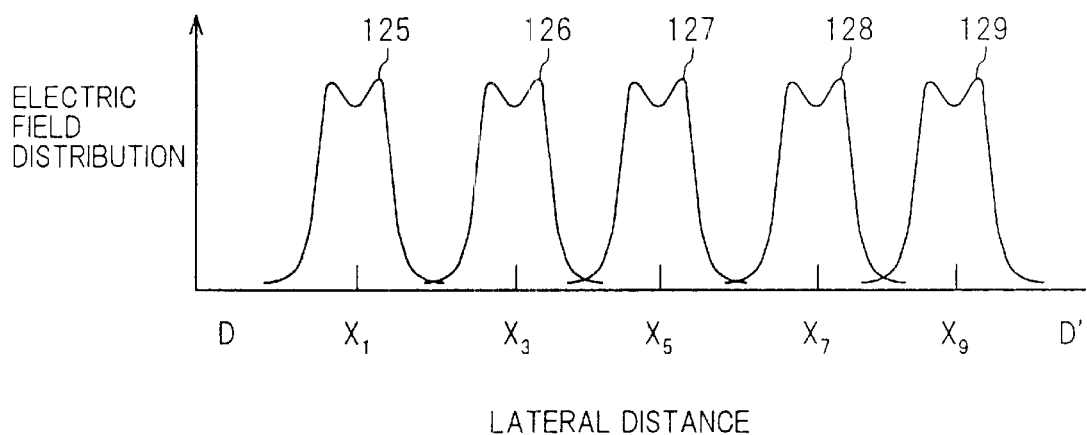
FIG. 11 schematically shows electric field distributions 125, 126, 127, 128 and 129 of optical signals $\lambda_1$, $\lambda_3$, $\lambda_5$, $\lambda_7$ and $\lambda_9$ at a focussing surface 124 of the multiplexer/demultiplexer of an arrayed waveguide diffraction grating type according to the invention.

FIG. 11 shows electric field distributions 125, 126, 127, 128 and 129 of the optical signals $\lambda_1$, $\lambda_3$, $\lambda_5$, $\lambda_7$, and $\lambda_9$ at the focusing surface 124 of the multiplexer/demultiplexer of the arrayed waveguide diffraction grating type according to the preferred embodiment of the invention. In the arrayed waveguide diffraction grating 106, the difference in the length ΔL between the adjacent channel waveguides 105 is designed so that ΔL satisfies the equation (1).

Hereafter, the function of the multiplexer/demultiplexer according to the invention will be explained mainly based on FIGS. 7A to 7B, and referring other drawings at need.

The optical signals $\lambda_1$ to $\lambda_9$ successively propagate through the input waveguide 102, the mode conversion portion 103, the input slab waveguide 104, the arrayed waveguide diffraction grating 106, the output slab waveguide 107 and the output waveguides 108.

First, the propagation of the optical signal from the input waveguide 102 to the input end 114 of the arrayed waveguide diffraction grating 106 will be explained.

As shown in FIG. 7A, the optical signals supplied from the input end 130 is transmitted to the mode conversion portion 103 via the input waveguide 102. At the output end of the mode conversion portion 103, the electric field distributions of the optical signals $\lambda_1$ to $\lambda_9$ show a common twin-peak-shaped profile 113 in the A–A' direction as shown in FIG. 8A.

As shown in FIG. 7B, the optical signals $\lambda_1$ to $\lambda_9$ are expanded in the input slab waveguide 104 by the effect of diffraction. As shown in FIG. 8B, the electric field distribution of each of the optical signals shows a profile 115 having the maximum and minimum values at the input end 114 of the arrayed waveguide diffraction grating 106 in the B–B' direction.

As shown in FIG. 9A, the phase of each optical signal is abruptly shifted by π in regions 129 which lie near both side ends of the phase distribution 118, because the electric field distribution is formed into a twin-peak-shaped profile by the mode conversion portion 103.

Next, the state of the optical signal will be explained when it is transmitted from the arrayed waveguide diffraction grating 106 to the output waveguide 108. Since the state of the optical signal in the aforementioned transmission changes dependently on the wavelengths of the optical signals, the state of the optical signal $\lambda_5$ satisfying the equation (1) will be explained in the first place, and thereafter the explanations will be given on the other optical signals.

As shown in FIG. 7B, the optical signal $\lambda_5$ is divided and supplied to the respective channel waveguides 105 at the input end 114 (close-by the arc BB') of the arrayed waveguide diffraction grating 106 and propagate therethrough. The divided optical signals flow together at the output end 116 (close-by the arc CC') of the arrayed waveguide diffraction grating 106.

As shown in FIG. 8C, the electric field distribution 117 is nearly the same as that at the input end 114 (close-by the arc BB') of the arrayed waveguide diffraction grating 106. On the other hand, since the optical signal $\lambda_5$ satisfies the equation (1), the phase distribution of the optical signal $\lambda_5$ at the output end 116 of the arrayed waveguide diffraction grating 106 coincides with that at the input end 114 of the same. The phase distribution 119 shown in FIG. 9B is symmetric and partially has regions 129 in which the phase abruptly shifts by π. Accordingly, as shown in FIG. 7B, the optical signal $\lambda_5$ focuses at a reference point 110 on the output slab waveguide 107.

As shown in FIG. 11, the electric field distribution 127 of the optical signal $\lambda_5$ on the focusing surface 124 is nearly the same as that 113 of the mode conversion portion 103 shown in FIG. 8A.

Moreover, as shown in FIG. 7B, the optical signal $\lambda_5$ propagates through the output waveguide 108 which is connected with the output slab waveguide 107 at the reference point 110, and is emitted from the output end 131.

Hereafter, the states of the optical signals other than the optical signal $\lambda_5$ will be explained, and the optical signals $\lambda_1$, $\lambda_3$, $\lambda_7$, and $\lambda_9$ will be taken up as examples.

As shown in FIGS. 7A and 7B, the optical signals $\lambda_1$, $\lambda_3$, $\lambda_7$, and $\lambda_9$ are respectively divided by the arrayed waveguide diffraction grating 106, and propagate through the respective channel waveguides 105. The electric field distributions of these optical signals at the output end 116 of the arrayed waveguide diffraction grating 106 are nearly the same as that of the optical signal $\lambda_5$.

However, as shown in FIGS. 10A to 10D, the differences in the phase distribution between the optical signals are generally curved and inclined. A curvature and an inclination becomes noticeable as the wavelength of the optical signal is remote from $\lambda_5$. The reason that the differences in the phase distribution between the optical signals are generally inclined is a chromatic dispersion of the phase constant β of the channel waveguides, and the optical signals are focused at different points dependently on their wavelengths because of the aforementioned inclinations. The reason that the differences in the phase distribution between the optical signals are curved is that the intervals between the channel waveguides 105 which compose the arrayed waveguide diffraction grating 106 generally vary in accordance with the equation (4), which cancels the effect of aberration of the output slab waveguide.

Accordingly, the respective optical signals are focused at points $X_1$ to $X_9$ (not shown) on the focusing surface 124 (closeby the arc DD') of the output slab waveguide 107, and the electric field distributions 125, 126, 128 and 129 of the optical signals $\lambda_1$, $\lambda_3$, $\lambda_7$, and $\lambda_9$ wholly show the symmetric twin-peak-shaped profiles, because the effect of aberration of the output slab waveguide 107 is canceled. Moreover, the respective optical signals launch the output waveguide 108, propagate therethrough, and respectively taken out from the output end 131.

Figure 12:
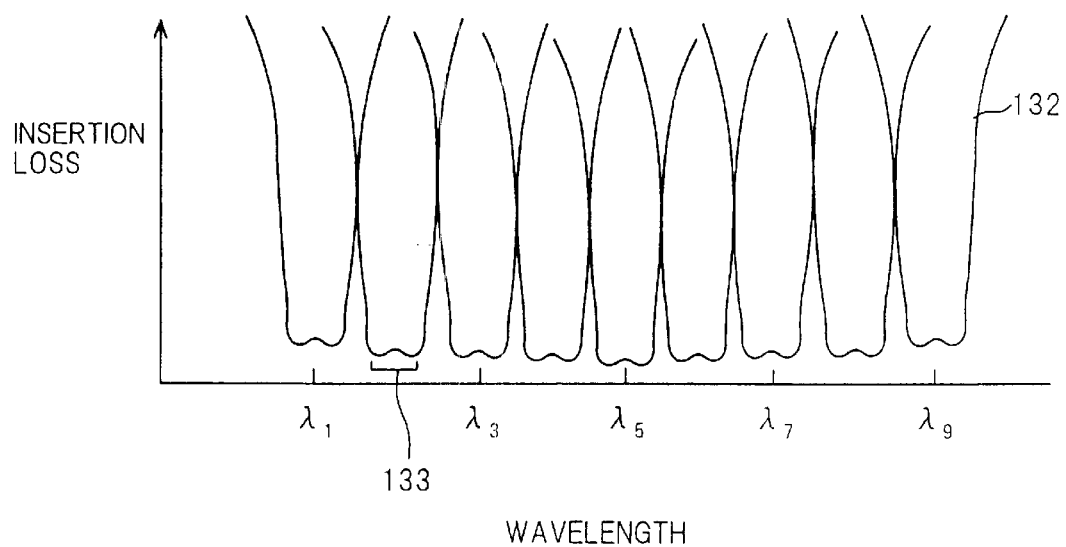
FIG. 12 schematically shows a relation 132 between an insertion loss and a wavelength of the multiplexer/demultiplexer of an arrayed waveguide diffraction grating type according to the invention.

FIG. 12 schematically shows the insertion losses 132 of the multiplexer/demultiplexer of the arrayed waveguide diffraction grating type according to the preferred embodiment of the invention as functions of the wavelength.

As shown in FIGS. 11 and 12, the insertion losses of the output waveguides 108 are respectively determined by the multiplexed integrals of the electric field distributions 125, 126, 127, 128 and 129 on the focusing surface 124 (close-by the arc DD') and the inherent mode functions of the respective output waveguides 108. Although the electric field distributions 125, 126, 127, 128 and 129 are displaced on the focusing surface 124 in the D–D' direction in accordance with the wavelengths, they are kept to have the twin-peak-shaped profiles. Accordingly, the insertion losses hardly fluctuate even if the wavelengths of the optical signals slightly fluctuate.

That is to say, as shown in FIG. 12, since the insertion loss against the wavelength characteristic 132 is flat and symmetric in the passband 133, the insertion losses do not fluctuate so much even if the wavelengths $\lambda_1$ to $\lambda_9$ fluctuate.

Material used for the substrate is never restricted to glass, but a semiconductor substrate can be adopted for the same purpose. Optically transparent material such as glass material or semiconductor material can be used as a core, a clad layer and a buffer layer.

Although the present inventors have already proposed a multiplexer/demultiplexer in which the angles formed by the adjacent channel waveguides discretely varies at predetermined points on the input and/or output ends of the arrayed waveguide diffraction grating to compensate aberration caused by the output slab waveguide (Japanese Patent No. 2950326, U.S. patent application Ser. No. 09/190,170), in the multiplexer/demultiplexer according to the invention, the angles formed by the adjacent channel waveguides continuously and slowly vary through the whole channel waveguides, so that aberration caused by the output slab waveguide can be more smoothly compensated than according to the aforementioned multiplexer/demultiplexer.

Although a single input waveguide 102 is connected with an input port of the mode conversion portion 103 in the multiplexer/demultiplexer shown in FIG. 7A, if plural input waveguides propagating optical signals with different wavelengths are connected with the input port of the mode conversion portion 103, the multiplexer/demultiplexer still fulfills the function of demultiplexing the inputted optical signals, because the input port of the mode conversion portion 103 serves as a coupler for multiplexing the inputted optical signals supplied through the plural input waveguides, though an optical loss of the coupler cannot be neglected.

As mentioned in the above, according to the multiplexer/demultiplexer for the WDM optical signals according to the invention, since aberration of the output slab waveguide is canceled and the flat passband characteristics can be obtained for the respective output waveguides by optimizing the deposition angles of the respective channel waveguides composing the arrayed waveguide diffraction grating at the input and output slab waveguides, the fluctuations of the insertion losses caused by the fluctuations of the wavelengths of the light sources can be reduced, and the WDM optical signals can be multiplexed or demultiplexed with high stability.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A multiplexer/demultiplexer comprising:
   at least one input waveguide formed on a substrate,
   plural output waveguides formed on said substrate,
   an arrayed waveguide diffraction grating composed of plural channel waveguides successively extending in a length by $\Delta L$,
   an input slab waveguide for coupling said at least one input an input slab waveguide for coupling said at least one input waveguide with an input end of said arrayed waveguide diffraction grating, and
   an output slab waveguide for coupling an output end of said arrayed waveguide diffraction grating with said output waveguides,
   an interval between central axes of said adjacent channel waveguides composing said waveguide diffraction grating slowly varying through said whole channel waveguides at one or both of said input and output ends of said arrayed waveguide diffraction grating
   said central axes of said channel waveguides forming said arrayed waveguide diffraction grating being radially disposed with respect to first and second predetermined reference points at both said input and output ends of said arrayed waveguide diffraction grating, and angles formed by said central axes of said adjacent channel waveguides slowly varying through said whole channel waveguides,
   wherein:
   said angle formed by said central axes of said adjacent channel waveguides at said input end. of said arrayed waveguide diffraction grating is determined so that:
   when a total number of said channel waveguides is N, a number assigned to one of said channel waveguides is i, a number assigned to a reference channel waveguide is j, said angle formed by said central axes of an ith channel waveguide and an i+1 th channel waveguide is $\Delta\theta_i$, and said angle formed by said central axes of a jth channel waveguide and a j+1 th channel waveguide is is $\Delta\theta_j$, $\Delta\theta_i$ is given by a relation that $$\Delta\theta_i = \Delta\theta_j \{1 + \Sigma_k A_k |i-j|^k\},$$

wherein $A_k$ is a constant, $A_k \neq 0$, and k is a positive integer.

2. A multiplexer/demultiplexer, according to claim 1, wherein:

$\Delta\theta i$ is given by a relation that $$\Delta\theta i = \Delta\theta j\{1+A_1|i-j|\},$$

wherein $A_1$ is a constant and $A_1 \neq 0$.

3. A multiplexer/demultiplexer, according to claim 2, wherein:

said $A_1$ satisfies a following relation that $$-0.001 < A_1 < 0.001.$$

4. A multiplexer/demultiplexer comprising:

at least one input waveguide formed on a substrate, plural output waveguides formed on said substrate, an arrayed waveguide diffraction grating composed of plural channel waveguides successively extending in a length by $\Delta L$, an input slab waveguide for coupling said at least one input an input slab waveguide for coupling said at least one input waveguide with an input end of said arrayed waveguide diffraction grating, an output slab waveguide for coupling an output end of said arrayed waveguide diffraction grating with said output waveguides, an interval between central axes of said adjacent channel waveguides composing said waveguide diffraction grating slowly varying through said whole channel waveguides at one or both of said input and output ends of said arrayed waveguide diffraction grating said central axes of said channel waveguides forming said arrayed waveguide diffraction grating being radially disposed with respect to first and second predetermined reference points at both said input and output ends of said arrayed waveguide diffraction grating, and angles formed by said central axes of said adjacent channel waveguides slowly varying through said whole channel waveguides, wherein:

said angle formed by said central axes of said adjacent channel waveguides at said output end of said arrayed waveguide diffraction grating is determined so that:

when a total number of said channel waveguides is N, a number assigned to one of said channel waveguides is i, a number assigned to a reference channel waveguide is j, said angle formed by said central axes of an ith channel waveguide and an i+1 th channel waveguide is $\Delta\phi_i$, and said angle formed by said central axes of a jth channel waveguide and a j+1 th channel waveguide is $\Delta\phi_j$, $\Delta\phi_i$ is given by a relation that $$\Delta\phi_i = \Delta\phi_j\{1+\Sigma_k B_k|i-j|^k\},$$

wherein $B_k$ is a constant $B_k \neq 0$, and k is a positive integer.

5. A multiplexer/demultiplexer, according to claim 4, wherein:

$\Delta\phi i$ is given by a relation that $$\Delta\phi i = \Delta\phi j\{1+B_1|i-j|\},$$

wherein $B_1$ is a constant and $B_1 \neq 0$.

6. A multiplexer/demultiplexer, according to claim 5, wherein:

said $B_1$ satisfies a following relation that $$-0.001 < B_1 < 0.001.$$

7. A multiplexer/demultiplexer comprising:

at least one input waveguide formed on a substrate, plural output waveguides formed on said substrate, an arrayed waveguide diffraction grating composed of plural channel waveguides successively extending in a length by $\Delta L$, an input slab waveguide for coupling said at least one input waveguide for coupling said at least one input waveguide with an input end of said arrayed waveguide diffraction grating, and an output slab waveguide for coupling an output end of said arrayed-waveguide diffraction grating with said output waveguides, an interval between central axes of said adjacent channel waveguides composing said waveguide diffraction grating slowly varying through said whole channel waveguides at one or both of said input and output ends of said arrayed waveguide diffraction grating wherein:

said $\Delta L$ satisfies a following relation that $$\Delta L = 2m\pi/\beta(\lambda_c),$$

wherein m is a positive integer, and $\beta(\lambda_c)$ is a propagation constant of said channel waveguides at a center wavelength of plural optical signals inputted to said multiplexer/demultiplexer.

\* \* \* \* \*